Nov. 28, 1939.   I. C. RINN   2,181,206
RACK FOR PHOTOGRAPHIC FILMS AND THE LIKE
Filed Dec. 30, 1938

Inventor:
Irwin C. Rinn,
by Thos. A. Banning
Atty.

Patented Nov. 28, 1939

2,181,206

UNITED STATES PATENT OFFICE 2,181,206

RACK FOR PHOTOGRAPHIC FILMS AND THE LIKE

Irwin C. Rinn, Chicago, Ill.

Application December 30, 1938, Serial No. 248,424

16 Claims. (Cl. 95—100)

This invention relates to improvements in racks for photographic films. More particularly, it has to do with racks for supporting individual photographic films of relatively small size, such as are used for dental X-ray work, but the features of the invention are not limited to this or any other particular use. Generally it may be stated that the rack herein disclosed is so arranged that the films are individually supported therein, and substantially without contact with the rack itself except along the edges of the film, the faces of the film being entirely clear from any contact with the rack itself.

One object of the invention is to provide a form of rack which may be used for supporting the films during the developing and/or fixing operations, and also for supporting the films after the developing and washing operations have been completed, and during the drying interval. The individual films when once set into place in the rack need not be removed therefrom until the developing, fixing and washing operations have been completed, and in fact until the drying operation has also been completed. This will make unnecessary the removal of the films from the rack while they are still wet, and when the emulsion is in a soft condition. The films may thus be removed after they have dried so that they are in proper condition for handling.

Another object of the invention is to provide a rack of such construction that the engagement of the films is entirely along the opposite edges and under a slight pressure, so that the films are securely held. In this connection, it is a further object to so form the rack that the films may be readily and individually released from the rack by merely pressing together a pair of lugs or finger pieces which are properly placed for convenient manipulation by the thumb and a finger of a single hand. Still more particularly, it is an object to so arrange the foregoing parts that each film may be individually manipulated, both during insertion and also during removal from the rack, the individual film supports in a multiple rack having individual means for manipulating the holding jaws or clamps.

In connection with the foregoing it is an object to so design the rack that it may be made from sheet metal or other material, cut or stamped out into the form of a blank and bent into the proper form, thereby forming the rack at a minimum of cost and maximum of simplicity. In connection with the foregoing, the metal used for the stamping operations may be of slightly springy quality so that the film engaging clamps or jaws will engage the edges of the film under the desired spring pressure, and so that the parts may be readily manipulated by the thumb and finger as above explained.

A further object of the invention is to so arrange the rack that the individual films will be retained against any sliding or displacing movement lengthwise of the rack, so that the films will be retained from any interference with each other. Such retaining means is also stamped or cut out from the blank from which the rack is made, and then properly formed into shape.

It is a further object to provide a rack which may be made with any number of cells or pockets for the individual films, or with a single cell or pocket. When made with more than one such cell or pocket, said cells or pockets are located in alignment with each other, in the form of an elongated rack member, having a width substantially equal to the lateral dimension of a film, and a length dependent on the number for films to be carried. It is a further object to provide a hanger or handle at one end of the rack whereby it may be readily manipulated, such hanger also constituting a portion of the sheet from which the rack blank is cut. Such hanger or handle constitutes a convenient element whereby the filled rack may be held in place within a vertical developing or fixing or washing bath vessel, by simply hooking the handle over the edge thereof; and also constitutes a convenient means whereby the rack with the contained films may be hung up during the film drying operations.

It may also be mentioned that the rack herein disclosed is very well adapted for supporting the films within a bath of solution which is of such a nature that the developing and fixing operations are simultaneously performed, so that only a single bath treatment is needed. Such solution constitutes no portion of the present invention, but due to the fact that it is relatively expensive it is desirable to use the same in connection with equipment of such construction that the bath material and solution may be most economically used; and the racks of the present invention, being elongated in form, are well adapted for vertical support within a tall container of generally cylindrical form, and of relatively small volume considering the number of films being simultaneously treated therein.

Other objects and uses of the invention will appear from a detailed description of the same, which consists in the features of construction and combinations of parts hereinafter described and claimed.

Figures 1, 2, 3, 4, 5:
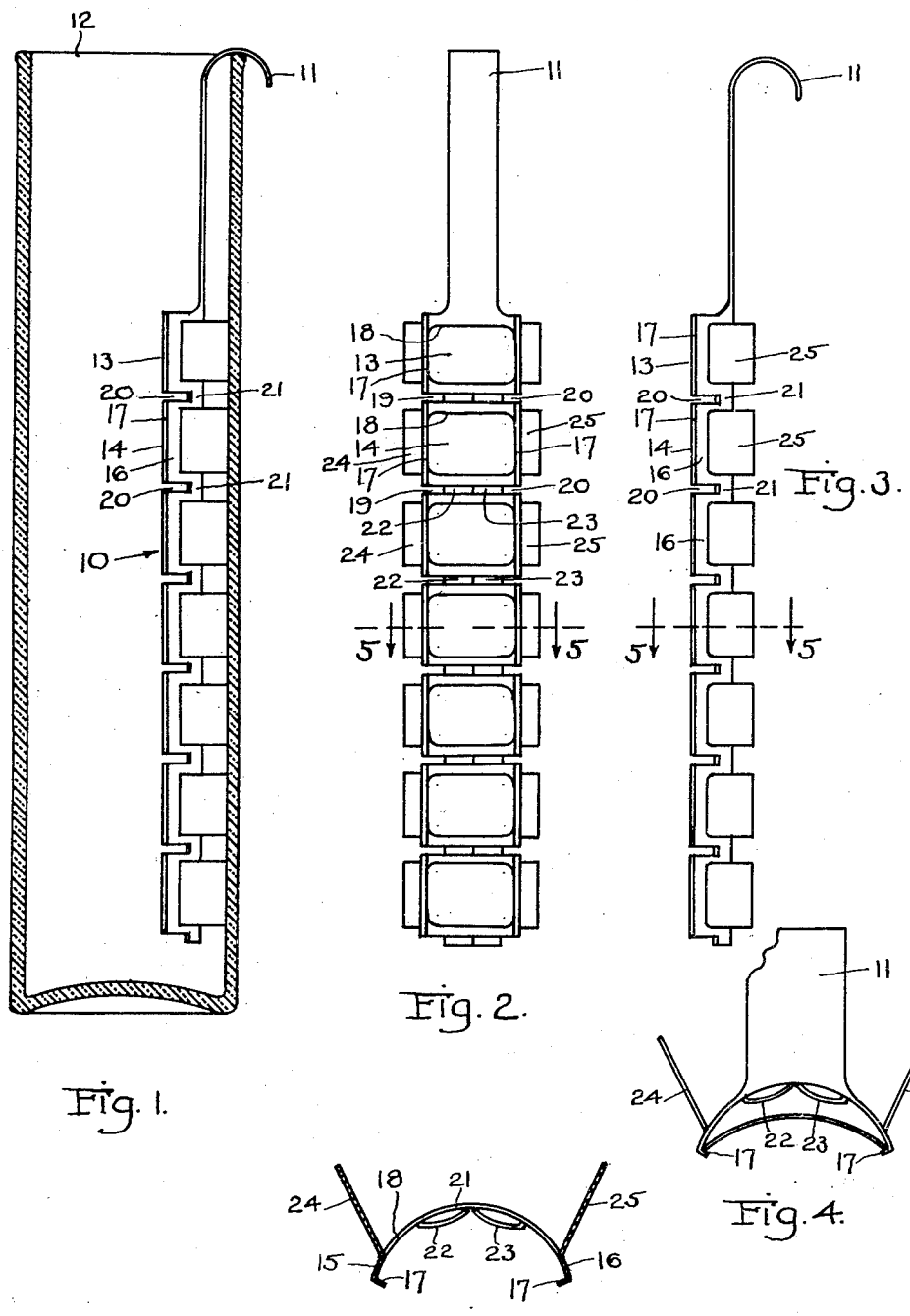
Figure 1 shows a vertical section through a convenient form of cylindrical container having the rack of the present invention set down therein, and with the hook placed over the upper edge of the top of the container.
Figure 2 shows a face view of the rack itself removed from the container.
Figure 3 shows a side or edge view corresponding to Figure 2.

Figure 4 shows a top or plan view corresponding to Figures 2 and 3, and also shows the manner of engagement of the film edges; and Figure 5 shows a cross-section on the line 5—5 of Figures 2 and 3 looking in the directions of the arrows, and it shows by dotted lines the manner in which the finger pieces may be bent towards together to thereby release the edges of the film or to permit insertion of the film into place.

Referring first to Figure 1, the rack in its entirety is designated by the numeral 10. This rack has a hooked handle at its upper end, designated 11, which may be set over the upper edge 12 of the container, so as to hold the rack in proper vertical position; and said handle 11 also constitutes a convenient means whereby the rack may be handled during insertion or removal from the container, and for other purposes. The container is conveniently made of generally circular cylindrical form, and since the rack itself is of generally curved cross-section it will conform to the curvature of the container wall when set into place in the container; and in fact two such racks with their films may be readily set into place within a common container and facing each other. It will thus be seen that the racks herein disclosed are of such form that they readily lend themselves to use during the developing and/or fixing or washing operations with a maximum of economy of space, so that a minimum amount of the solution is needed for the operations.

Referring to Figures 2, 3, 4 and 5, the rack itself comprises a sheet of suitable material stamped or cut and formed to provide the handle 11, together with one or more individual film cells or pockets, such as 13, 14, etc., extending in vertical alignment as shown. Each of these cells or pockets has the side edge portions 15 and 16, which have their extreme edges 17 recurved or so bent as to form hooked portions to engage the edges of the film and hold the film securely in place with a slight amount of lateral pressure thereagainst. The cells are of curved form as shown in Figures 4 and 5, and the distance between the edge portions 15 and 16 is such that when a film is in place said film may be firmly gripped, and will be deflected into a generally curved form but without contact of the face of the film with the body portion of the rack between the film edges. In other words, the curved distance around the body of the rack from one edge 15 to the other edge 16 is slightly greater than the actual distance between the opposite edges of the film to be gripped, but the straight cord distance between the two rack edges 15 and 16 is slightly less than the distance between the opposite edges of the film to be gripped; so that when the film is in place and the springy action of the rack is permitted to grip the film, the film will be gripped and curved as shown, but with a less curvature than that of the body of the rack, so that there is no actual bodily contact between the film and the rack. By reason of this relationship it follows that the film support is entirely against the edges of the film, and without face contact therewith.

In order to still further ensure against any bodily contact between the face of the film and the body of the rack, and also to improve the springy action of the rack edges 15 and 16, I prefer to cut out the central portion of each film cell or pocket as shown at 18. The amount of metal thus left at the position of each cell or pocket is reduced to a minimum, the rack is greatly lightened, and the danger of face contact with the films is greatly lessened during the operations of setting the films into place in the rack and removal therefrom.

I also prefer to cut away the metal of the sheet at the positions 19 and 20 between the edge portions of consecutive film cells and at both sides of the rack, such so cut away portions, however, not extending completely across the rack, so that the consecutive cells are joined together as shown at 21 in Figures 2 and 3. In other words, the cut-away portions 19 and 20 only extend about half way across the width of the rack, leaving the central portions uncut, so that the continuity of the rack body is not impaired.

The material cut from the slotted portions 19 and 20 (being in the form of a pair of narrow prongs 22 and 23), is bent back over the front face of the uncut portion 21, such so bent prongs being also curved so that they stand out from the face of the portion 21, as well shown in Figures 4 and 5 in particular. The distance between the prongs 22 and 23 at the top and bottom of each cell or pocket is substantially equal to the vertical dimension of the film to be supported within the cell, and the extension of these prongs outwardly from the face of the connecting portion 21 is such that edge support is provided for the films in the adjoining cells or pockets; and thus, also, the films are prevented from displacement lengthwise of the rack and are retained within their individual pockets and are prevented from interference with each other. When the slots 19 and 20 are carried substantially one-half way across the width of the rack, as shown, and when the so formed prongs 22 and 23 are bent into the form shown in Figures 4 and 5, it will be seen that the ends of the prongs come substantially together and thus form a substantially continuous narrow projecting ledge or film edge support between the edges of the consecutive films, and also serve to avoid the presence of objectionable sharp ends (of the prongs) which might become contacted by the faces of the films during the film insertion and removal operations.

It will also be noted that by the slotting of the body portion of the rack to form the slots 19 and 20, the edge portions 14 and 15 are individualized so that the flexing and positioning of the edges of each cell or pocket is made independent of that of the adjoining cells or pockets. Thereby there is assurance that the edges of each film will be gripped individually and according to the exact requirements of such film; but in addition thereto, it will be noted that by flexing the edge portions of a given cell or pocket the film of such pocket may be inserted or removed without interfering with the films in the adjoining cells or pockets. Thereby a double purpose and function is produced.

The material cut or released from the body opening 21 of each cell or pocket is in the form of two wings 24 and 25, each comprising one half the width of such opening 21; and these two wings are bent backwardly as shown in Figures 4 and 5 to form the finger pieces which may be manipulated for flexing the edge portions 15 and 16. These wings are preferably bent at an angle of substantially thirty degrees to the transverse axis, as shown in Figures 4 and 5, so that they occupy a position which is convenient for manipulation, and also so that they will reach laterally with respect to the edges 15 and 16 to a position where they can be readily manipulated.

Now it will be seen that the normal elasticity of the edge portions of the cells or pockets is such that they occupy the positions to grip the film edges, but that by compressing the wings 24 and 25 towards each other said edge portions are caused to shift apart from each other, with consequent increase of the distance between them so that the film may be readily inserted or removed; and further that such operation in the case of any individual cell or pocket does not interfere with the holding grip of the adjoining cells or pockets on their respective films.

It is noted that the curvature of the body portion of the rack, well evident in Figures 4 and 5 serves to give a longitudinal rigidity to the device so that it will not readily bend or become distorted transversely. This is an important feature especially in the case of a rack having considerable length, as for example, in a rack having five or six cells or pockets.

It will be noted that the hook of the handle 12 extends outwardly at the convex side of the curvature of the body portion, so that when the rack is set down into a round cylindrical container with the convex side of the body towards the wall of the container the hook will properly reach out over the wall of the container to engage said wall. In such condition two such racks with their contained films may be readily set down into the cylindrical container, of given size, thus virtually doubling the capacity of the container.

The rack may be made of any suitable material, but preferably sheet metal of springy nature is used since it may be readily cut into the proper form, and when so cut will have the desired springiness. Or, if desirable, the rack may be made by assembling operations and of wire.

It is noted that the central vertical axis of the complete rack resembles a backbone with the radiating arms constituting a series of ribs to which the edge portions 14 and 15 are connected. Normally the depth of the container within which the rack is set during developing and/or fixing and washing operations should be such that the rack will be actually suspended by the hook portion of the handle 12. In case it should be desired to stand the rack on the floor of the container, a foot or pedestal 26 may be formed on the lower end of the backbone portion, constituting a portion of the metal of which the rack is formed.

While I have herein shown and described only a single embodiment of the features of my present invention, still I do not intend to limit myself thereto, except as I may do so in the claims to follow.

I claim:

1. As a new article of manufacture, a rack for individual films and the like, comprising a sheet of springy metal cut and formed to provide a series of aligned film cells or pockets each comprising a substantially rectangular open bodied cell section having its sides provided with parallel edge grooves to receive the opposite edges of a film section, and each cell section having the metal cut from its open body portion folded backwardly along the positions of the sides of such cell section to provide wings for actuation by the fingers of a hand to deflect the edge portions of the cell outwardly from each other against the spring action of the metal, the sheet metal of the rack being cut inwardly from each side at points intermediate between the consecutive cells with central uncut portions constituting connections between the consecutive cells, and the metal of such inwardly cut portions being folded over the faces of the said connections to constitute top and bottom film supports between the cells, the rack being curved transversely along its length to provide a channel shaped device, whereby the lateral portions of the consecutive cells or pockets may be individually deflected without interference with the lateral portions of adjacent cells and by compression of the wings of a given cell or pocket towards each other, substantially as described.

2. As a new article of manufacture, a rack for individual films and the like, comprising a sheet of springy metal cut and formed to provide a series of aligned film cells or pockets each comprising a substantially rectangular open bodied cell section having its sides provided with parallel edge grooves to receive the opposite edges of a film section, and each cell section having the metal cut from its open body portion divided and folded backwardly from the two edge portions of such cell section to thereby establish a pair of wings connected to such edge portions, the sheet metal of the rack being cut inwardly from the sides thereof at points intermediate between the cell sections to thereby disconnect the edge portions of the cell sections from each other, and with the central portions of the cell sections adjoining each other connected together, the rack being curved transversely along its length with the wings at the convex side of such curvature, whereby the side portions of individual cells may be deflected away from each other by pressure on the wings thereof, to thereby permit insertion into or removal from such cell sections of the individual films, substantially as described.

3. As a new article of manufacture, a rack for individual films and the like, comprising a series of film cells or pockets, each of generally rectangular form and having its side edges provided with facing grooves for accommodation of the opposite edge portions of films to grip the same, said cells or pockets being of springy material whereby the said edge portions tend to spring towards each other for film engagement and holding, backwardly extending wings on the edge portions aforesaid adapted for gripping engagement by the fingers of a user's hand, whereby compression of said wings towards each other serves to cause the edge portions to move away from each other for film insertion or removal into or from the cell, the rack being curved transversely and along its length, whereby the rack is stiffened, and whereby when films are gripped within the cells or pockets they may be gripped exclusively by engagement with their edge portions and without bodily contact against the body portion of the rack, substantially as described.

4. As a new article of manufacture, a rack for individual films and the like, comprising a series of film cells or pockets, each of generally rectangular form and having its side edges provided with facing grooves for accommodation of the opposite edges of films to grip the same, said cells or pockets being of springy material whereby the said edge portions tend to spring towards each other for film engagement and holding, backwardly extending wings connected to the said edge portions in position for compressing engagement by the fingers of a hand to thereby deflect the said edge portions away from each other for film insertion or removal into or from the cell or pocket, together with connections between the consecutive cells or pockets located along the central axis of the rack, the rack being curved transversely and along its length, substantially as described.

5. As a new article of manufacture, a rack for individual films and the like, comprising a series of film cells or pockets, each of generally rectangular form and having its side edges provided with facing grooves for accommodation of the opposite edges of films to grip the same, said cells or pockets being of springy material whereby said edge portions tend to spring towards each other for film engagement and holding, backwardly extending wings connected to the said edge portions in position for compressing engagement by the fingers of a hand to thereby deflect the said edge portions away from each other for film insertion or removal into or from the cell or pocket, together with connection between the consecutive cells or pockets located along the central axis of the rack, substantially as described.

6. As a new article of manufacture, a rack for individual films and the like, comprising a series of film cells or pockets in alignment with each other and each of generally rectangular form and all of the cells or pockets being curved transversely of the length of the rack and with their convex sides all at the same side of the series, the lateral edge portions of the cells or pockets being grooved with the grooves facing each other and all at the concave side of the device, wings extending backwardly from the edge portions of the individual cells or pockets and in position for compressing engagement by the fingers of the hand to thereby deflect the said edge portions away from each other for film insertion into or removal from the cell, together with connections between the consecutive cells or pockets and located along the central longitudinal axis of the rack, substantially as described.

7. As a new article of manufacture, a rack for individual films and the like, comprising an elongated structure in the form of a series of film cells or pockets each of generally rectangular form and with all the cells or pockets curved transversely of the rack with the convex sides of the curves all at one side of the rack, the consecutive cells or pockets being connected to each other exclusively along relatively narrow points of joinder located inwardly from the edges of said cells or pockets, the edge portions of the cells or pockets being grooved inwardly to receive the edge portions of the films placed in said cells or pockets, together with backwardly extending wings connected to the said edge portions, substantially as described.

8. As a new article of manufacture, a rack for individual films and the like, comprising an elongated structure in the form of a series of individual film cells or pockets, each of generally rectangular form and curved transversely of the rack, facing grooves along the side edges of the cells adapted to receive the edge portions of films set therein, the cells being of springy material to thereby grip the side edges of the films with spring pressure, the curved length of a cell between the said grooves being slightly more than the distance between the proximate edge of the gripped film, whereby the so gripped film is held under spring pressure and with the body portion of the film away from the body portion of the pocket or cell, together with backwardly extending wings connected to the edge portions of the cells, and adapted for compressing towards each other by the fingers of a hand, substantially as described.

9. As a new article of manufacture, a rack for individual films and the like, comprising an elongated structure in the form of a series of individual film cells or pockets, each of generally rectangular form and curved transversely of the rack, facing grooves along the side edges of the cells adapted to receive the edge portions of films set therein, the cells being of springy material to thereby grip the side edges of the films with spring pressure, the curved length of a cell between the said grooves being slightly more than the distance between the proximate edges of the gripped film, whereby the so gripped film is held under spring pressure and with the body portion of the film away from the body portion of the pocket or cell, substantially as described.

10. As a new article of manufacture, a rack for individual films and the like, comprising an elongated structure in the form of a series of individual film cells or pockets, each of generally rectangular form and curved transversely of the rack, there being facing film edge engaging grooves along the outer edges of the said cells or pockets, and means to join the central portions of the upper and lower edges of the consecutive cells or pockets together, the curved distance between the grooves of a cell or pocket being slightly more than the distance between the engaged edges of the film therein, whereby the film is held within the cell or pocket under spring pressure and with its body portion away from engagement with the body portion of the cell or pocket, substantially as described.

11. As a new article of manufacture, a rack for individual films and the like, comprising a film holding cell or pocket, curved to bring its body portion laterally away from the opposite edge portions of such cell or pocket, there being facing grooves on said edge portions to grip a film therebetween, the material of such cell or pocket being springy, and the distance between said grooves being slightly more, measured along the curve of the body, than the distance between the so gripped edge portions of the film whereby the film is gripped and held with its body portion away from the body portion of the cell or pocket, substantially as described.

12. As a new article of manufacture, a rack for a series of individual films to be developed or fixed or washed in a bath contained within a vertical cylindrical container, comprising an elongated member of transversely curved form to generally conform to the curvature of said container, said elongated member having a series of individual cells or pockets for film accommodation, each such cell or pocket having its opposite side edges provided with facing grooves for accommodation of the edges of a film, the edge portions of the individual cells or pockets being independent of each other, and the curved distance between the grooves of a cell or pocket being slightly more than the distance between the so gripped edges of the film, whereby the films are gripped with their body portions out of engagement with the body portions of the cells or pockets, substantially as described.

13. Means to treat a series of films to a liquid solution, comprising a cylindrical vertical container for the said solution, and a rack extending vertically within the container, and being of transversely curved form with its convex side adjacent to the wall of the container, said rack having means to support the individual films out of engagement with each other, substantially as described.

14. Means to treat a series of films to a liquid solution, comprising a container having a vertical wall, and adapted to contain said solution, and a rack extending vertically within said container and adjacent to the said wall, said rack being curved transversely with the curvature thereof adjacent to the wall aforesaid, and said rack being provided with a series of individual film cells or pockets, substantially as described.

15. Means to treat a series of films to a liquid solution, comprising a vertically elongated container for the liquid and having a curved wall, together with a vertically extending rack within said container and being of generally curved form to conform with the curvature of the wall of the container, and said rack having a series of individual film cells or pockets in vertical alignment, whereby the films accommodated in said cells or pockets are subjected to treatment within a container having a relatively small volume of solution for a given number and size of the films being treated, substantially as described.

16. As a new article of manufacture, means to support a film to be treated to a liquid solution or the like, comprising a cell or pocket of generally rectangular form and of springy material, said device being curved into generally cylindrical form, and having facing grooves along its opposite side edges for accommodation of the opposite edges of a film to be held therein, together with a film held in place in said support, and having its opposite edges inserted into the grooves aforesaid, said film being of distance between said edges slightly less than the curved distance between the grooves, whereby the film is held in place with its body portion out of engagement with the body portion of the cell or pocket, substantially as described.

IRWIN C. RINN.